US010101002B2

(12) United States Patent
Richter et al.

(10) Patent No.: US 10,101,002 B2
(45) Date of Patent: Oct. 16, 2018

(54) LIGHT FIXTURE WITH FABRIC LAYER HAVING PRINTED DOTS

(71) Applicant: Apple Inc., Cupertino, CA (US)

(72) Inventors: Bernd Richter, Heubach (DE); Casey Feeney, Los Gatos, CA (US); Michael Cook, San Jose, CA (US); Christopher Daniel Peak, Oakland, CA (US); Matthais Jäckl, Dalkingen (DE); Sebastian Röhrer, Aalen (DE); Sean Hennessy, Portland, OR (US)

(73) Assignee: Apple Inc., Cupertino, CA (US)

( * ) Notice: Subject to any disclaimer, the term of this patent is extended or adjusted under 35 U.S.C. 154(b) by 213 days.

(21) Appl. No.: 14/936,493

(22) Filed: Nov. 9, 2015

(65) Prior Publication Data

US 2017/0130929 A1 May 11, 2017

(51) Int. Cl.

| | |
|---|---|
| ***F21V 1/16*** | (2018.01) |
| ***F21V 1/02*** | (2006.01) |
| ***F21V 1/20*** | (2006.01) |
| ***F21V 1/22*** | (2006.01) |
| ***E04B 9/32*** | (2006.01) |
| ***F21S 8/02*** | (2006.01) |

(Continued)

(52) U.S. Cl.

CPC .................. *F21V 1/16* (2013.01); *E04B 9/32* (2013.01); *F21S 8/026* (2013.01); *F21V 1/02* (2013.01); *F21V 1/20* (2013.01); *F21V 1/22* (2013.01); *F21V 11/14* (2013.01); *F21V 13/02* (2013.01); *E04B 2009/0492* (2013.01); *F21Y 2115/10* (2016.08)

(58) Field of Classification Search

CPC .... E04B 9/32; F21S 8/026; F21V 1/16; F21V 3/12; F21V 5/10; F21V 9/08; F21V 9/30; F21V 9/32; F21V 9/38; F21V 9/40; F21V 9/45

See application file for complete search history.

(56) References Cited

U.S. PATENT DOCUMENTS 3,788,206 A * 1/1974 Mulvey .................... F21S 8/02
362/260
6,623,142 B1 9/2003 Lippmann et al.

(Continued)

FOREIGN PATENT DOCUMENTS

DE 201 03 644 U1 6/2001
DE 10 2013 016 842 A1 6/2014

(Continued)

OTHER PUBLICATIONS

Machine translation of EP 2221528, retrieved Jul. 27, 2017 from espacenet.com.*

(Continued)

*Primary Examiner* — Anh Mai
*Assistant Examiner* — Steven Horikoshi
(74) *Attorney, Agent, or Firm* — Sterne, Kessler, Goldstein & Fox P.L.L.C.

(57) ABSTRACT

A light fixture is disclosed. The light fixture includes a frame, a light source disposed within and coupled to the frame, and a lens coupled to the light source. The light also includes a first fabric layer coupled to the frame at a first distance from the lens and a second fabric layer coupled to the frame at a second distance from the lens. The first fabric layer has a plurality of dots printed thereon.

32 Claims, 12 Drawing Sheets

(51) Int. Cl.

| | |
|---|---|
| ***F21V 11/14*** | (2006.01) |
| ***F21V 13/02*** | (2006.01) |
| *F21Y 115/10* | (2016.01) |
| *E04B 9/04* | (2006.01) |

(56) References Cited

U.S. PATENT DOCUMENTS

| | | | | |
|---|---|---|---|---|
| 9,217,247 | B2 | 12/2015 | Behling et al. | |
| 2002/0172038 | A1* | 11/2002 | Dicken | F21S 2/00 362/224 |
| 2006/0082987 | A1* | 4/2006 | Dorsey | F21S 48/215 362/103 |
| 2009/0207604 | A1* | 8/2009 | Robotham | F21S 10/02 362/230 |
| 2010/0127282 | A1* | 5/2010 | Harbers | F21V 9/10 257/89 |
| 2010/0188609 | A1* | 7/2010 | Matsuki | H01L 33/58 349/64 |
| 2013/0083544 | A1* | 4/2013 | Hosoda | G02B 5/0221 362/355 |
| 2014/0185275 | A1* | 7/2014 | Smith, III | A43B 3/001 362/103 |
| 2015/0259945 | A1* | 9/2015 | Klinkel | E04H 15/10 135/91 |

FOREIGN PATENT DOCUMENTS

| | | | |
|---|---|---|---|
| DE | 20 2013 105 914 | U1 | 3/2015 |
| EP | 2 221 528 | A2 | 8/2010 |
| EP | 2 472 174 | A1 | 7/2012 |
| GB | 2 365 108 | A | 2/2002 |
| WO | WO 2013/133147 | A1 | 9/2013 |

OTHER PUBLICATIONS

International Search Report and the Written Opinion of the International Searching Authority for International Application No. PCT/US2016/061057, dated Mar. 7, 2017.

* cited by examiner

LIGHT FIXTURE WITH FABRIC LAYER HAVING PRINTED DOTS

FIELD

The described embodiments relate generally to a light fixture and specifically to a light fixture that produces light having particular color characteristics.

BACKGROUND

Light fixtures may be used to provide light, for example, in a retail setting.

SUMMARY

The present disclosure details systems, apparatuses, and methods related to light fixtures that produce light with particular color characteristics. A light fixture may include a frame, a light source disposed within and coupled to the frame, a lens coupled to the light source, a first fabric layer coupled to the frame at a first distance from the lens and having a plurality of dots printed thereon, and a second fabric layer coupled to the frame at a second distance from the lens.

In some embodiments, the second fabric layer encloses the light source, the lens, and the first fabric layer within the frame. In some embodiments, the dots comprise ink. In some embodiments, the dots form a matrix. In some embodiments, the dots are uniformly distributed on the first fabric layer.

In some embodiments, the first fabric layer comprises a lightly woven fabric. In some embodiments, the first fabric layer comprises a translucent fabric. In some embodiments, the first fabric layer comprises gauze. In some embodiments, the first fabric layer comprises a sheer fabric.

In some embodiments, the second fabric layer comprises a finished fabric. In some embodiments, the light source comprises a light-emitting diode. In some embodiments, the frame comprises an acoustical panel. In some embodiments, the lens comprises a diverging lens. In some embodiments, the second fabric layer comprises a light diffuser. In some embodiments, the second fabric layer comprises glass fiber. In some embodiments, the second fabric layer comprises polyester.

In some embodiments, the first fabric layer is configured to adjust a color characteristic of light emanating from the light source by interaction with the dots. In some embodiments, the color characteristic comprises color temperature. In some embodiments, the first fabric layer is configured to adjust a color characteristic of light emanating from the light source by a combination of reflecting light, passing light through areas of the first fabric layer without dots, and passing light through the dots.

According to some embodiments, a method of producing light with desired color characteristics includes diverging light emanating from a light source through a lens, passing the light through a first fabric layer having a plurality of dots disposed thereon, and passing the light through a second fabric layer configured to diffuse the light. In some embodiments, the color characteristics of the light are altered by the first fabric layer and the second fabric layer.

In some embodiments, the dots comprise ink. In some embodiments, the dots are printed on the first fabric layer. In some embodiments, the dots are disposed in a pattern on the first fabric layer. In some embodiments, the color characteristics comprise color temperature. In some embodiments, the produced light is homogeneous throughout the second fabric layer.

According to some embodiments, a method of making a light capable of producing light with desired color characteristics includes selecting a light source that approximates the desired color characteristics, printing a plurality of ink dots on a first fabric layer, passing light emanating from the light source through a lens, the first fabric layer, and a second fabric layer, measuring color characteristics of the light, and adjusting a parameter of the plurality of printed ink dots based on measuring the color characteristics.

In some embodiments, adjusting a parameter comprises adjusting a pattern of the printed ink dots. In some embodiments, adjusting a parameter comprises adjusting a color of the printed ink dots. In some embodiments, adjusting a parameter comprises adjusting a shape of the printed ink dots. In some embodiments, adjusting a parameter comprises adjusting a size of the printed ink dots. In some embodiments, adjusting a parameter comprises adjusting a density of the printed ink dots. In some embodiments, the method further includes adjusting a color of the second fabric layer.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
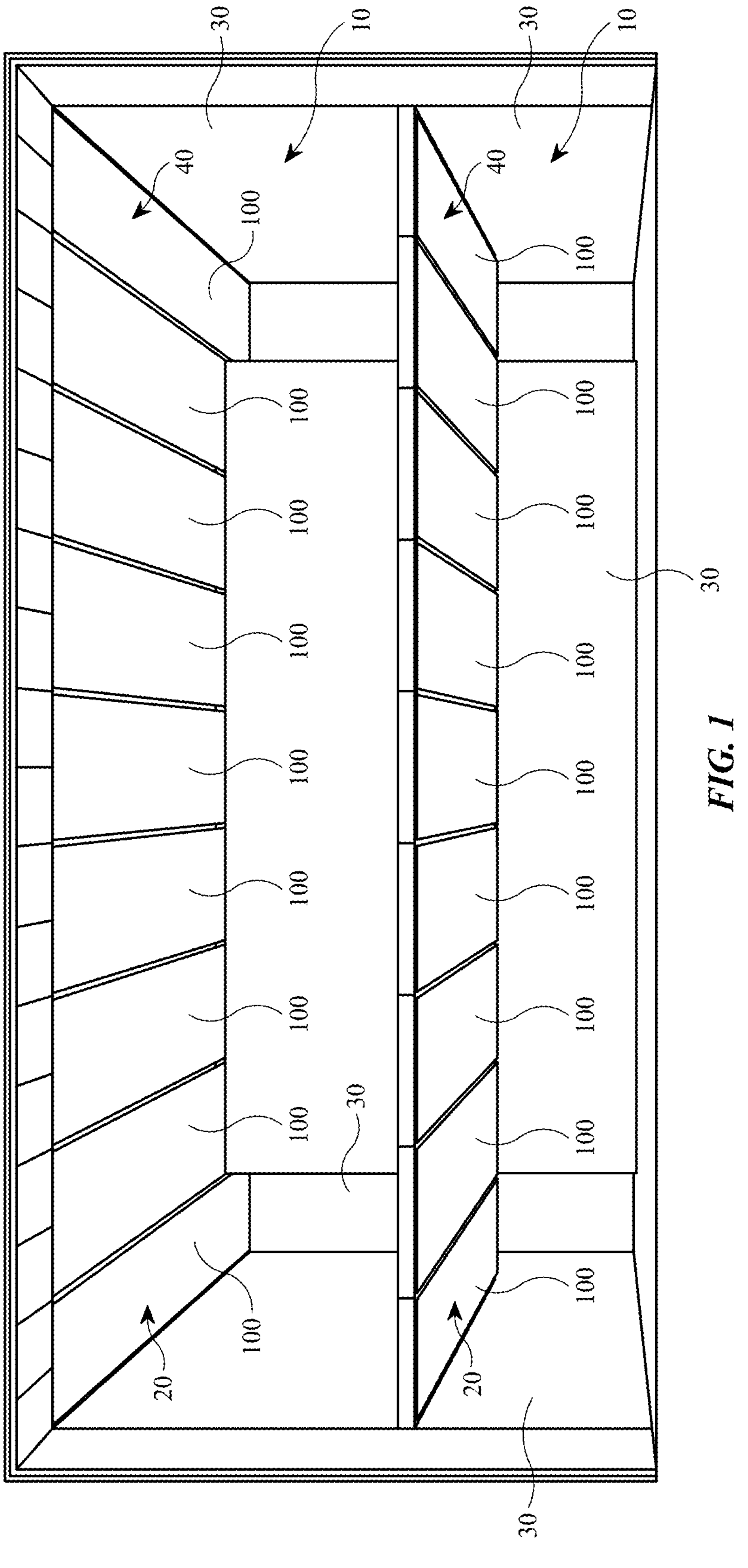
FIG. 1 shows a front perspective view of rooms including a light fixture according to some embodiments.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the claims.

Retailers may use light fixtures to promote visibility and to enhance and contribute to the look and feel of the retail space. In some settings, particular light characteristics may be desired to convey certain messages or feelings to a customer. These characteristics can include a light's chromaticity coordinates as well as luminous flux. Chromaticity coordinates correspond to a particular correlated color temperature (CCT) and Duv value. Manufacturers of light-emitting diodes (LEDs), according to industry standards, categorize each LED into a bin that corresponds to a range of CCT and Duv values. Because the bins cover a range of values, commercially-available LEDs are not guaranteed to produce light having an exact CCT and Duv value. Accordingly, to provide light in the retail space having a particular CCT and Duv value, modifications to the color characteristics of an LED must be made. Thus, the inventors have found it desirable to provide a light fixture that can modify the color characteristics of commercially-available LEDs, as described herein.

The following disclosure relates to light fixtures that produce light having particular color characteristics. Light fixtures according to embodiments of the present invention may be used in a retail setting, as well as in other settings. For example, a light fixture may be used in a library, office, school, or home setting. Light fixtures may be provided as a ceiling light, wall light, or other type of fixture.

In some embodiments, light fixtures may include a frame, a light source (such as an LED), a lens, a first filter layer (e.g., a first fabric layer), and a second filter layer (e.g., a second fabric layer). As light emanates from the light source and passes through the lens and fabric layers, characteristics of the light are altered so that the light output produced by the light fixture has the desired characteristics.

In some embodiments, the light first passes through the lens, which diverges the light to emanate at a wider angle. The first fabric layer is disposed at a first distance from the lens and includes a plurality of dots disposed (e.g., printed) thereon. The dots may be a certain color, shape, and size. In addition, the dots may be printed in a pattern with a particular density. As the light passes through the first fabric layer, the characteristics of the light change. The light beams that pass through the dots mix with the light beams that only pass through the fabric itself.

The second fabric layer is disposed at a second distance from the lens and acts as a light diffuser. Some of the light reflects back towards the first fabric layer, thus further altering the color characteristics as some beams pass through the dots (for a first or second time). The mixture of the beams of various color characteristics produces light that passes through the second fabric layer having the desired characteristics.

These and other embodiments are discussed below with reference to the figures. However, those skilled in the art will readily appreciate that the detailed description given herein with respect to these figures is for explanatory purposes only and should not be construed as limiting.

Figure 2:
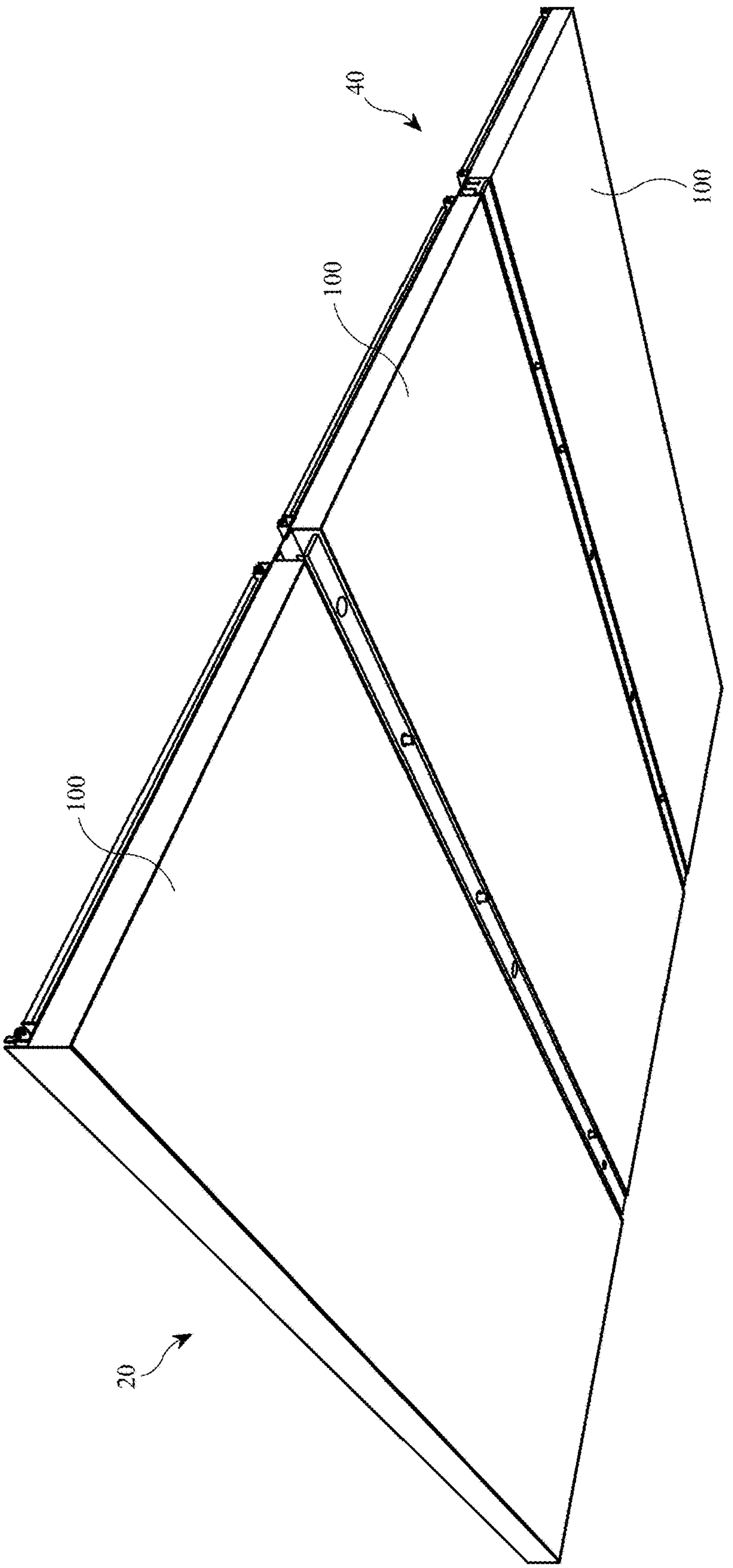
FIG. 2 shows a perspective view of a ceiling system including a light fixture according to some embodiments.

A light fixture 100 according to some embodiments may be used in rooms 10, as shown, for example, in FIG. 1. In some embodiments, light fixture 100 may be located on a ceiling 20 of room 10. In some embodiments, light fixture 100 may be located on a wall 30 of room 10. In some embodiments, room 10 includes a ceiling system 40 that has multiple light fixtures 100 disposed on ceiling 20, as shown in FIGS. 1 and 2.

Figure 3:
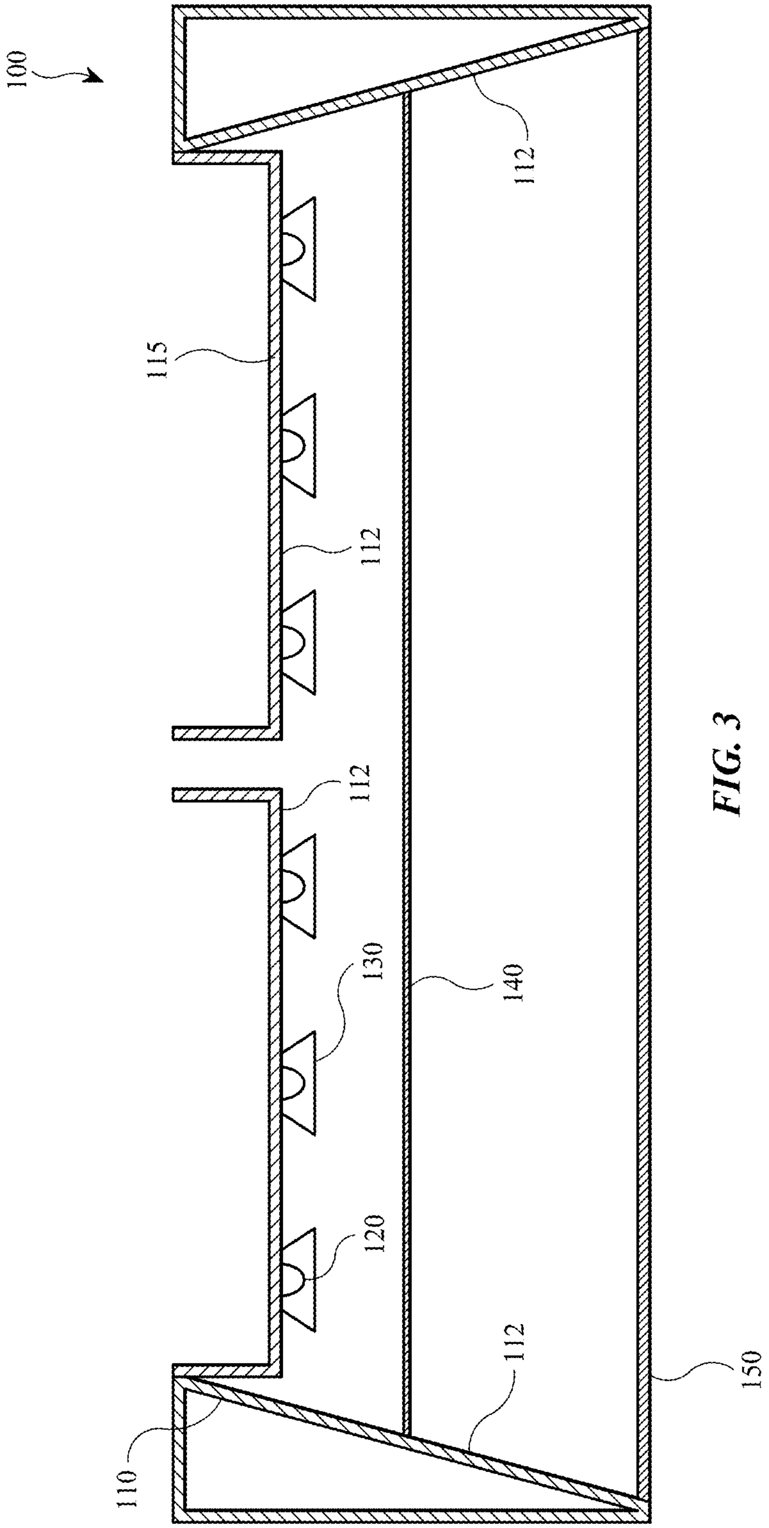
FIG. 3 shows a cross-section view of a light fixture according to some embodiments.

Light fixture 100 according to some embodiments is illustrated, for example, in FIG. 3. In some embodiments, light fixture 100 may include a frame 110, a light source 120, a lens 130, a first filter layer 140 (e.g., first fabric layer 140), and a second filter layer 150 (e.g., second fabric layer 150).

Frame 110, according to some embodiments, is the structure that supports light fixture 100 and provides an interface between light fixture 100 and the portion of the retail area that holds light fixture 100, such as a ceiling or a wall. In some embodiments, frame 110 includes acoustical panels 115. According to some embodiments, acoustical panels 115 may be disposed on the ceiling or the wall as part of frame 110. In some embodiments, frame 110 partially encloses other components of light fixture 100, such as light source 120, lens 130, and first fabric layer 140.

In some embodiments, frame 110 is a rectangular shape. In some embodiments, frame 110 may be circular, oval, square, or other polygonal shape. Various lengths and widths may be used for frame 110. In some embodiments, frame 110 may have a length that extends across a ceiling from one end to another end. See FIG. 1 for example. For example, frame 110 may have a length of at least 50 feet, at least 80 feet, or at least 100 feet. Multiple light fixtures 100 and frames 110 may be used in a single retail setting to provide light across a room, as in FIG. 1.

In some embodiments, the inner surface 112 of frame 110 comprises a reflective material. For example, in some embodiments, the inner surface of frame 110 may be equipped with a reflective paint.

Figure 4:
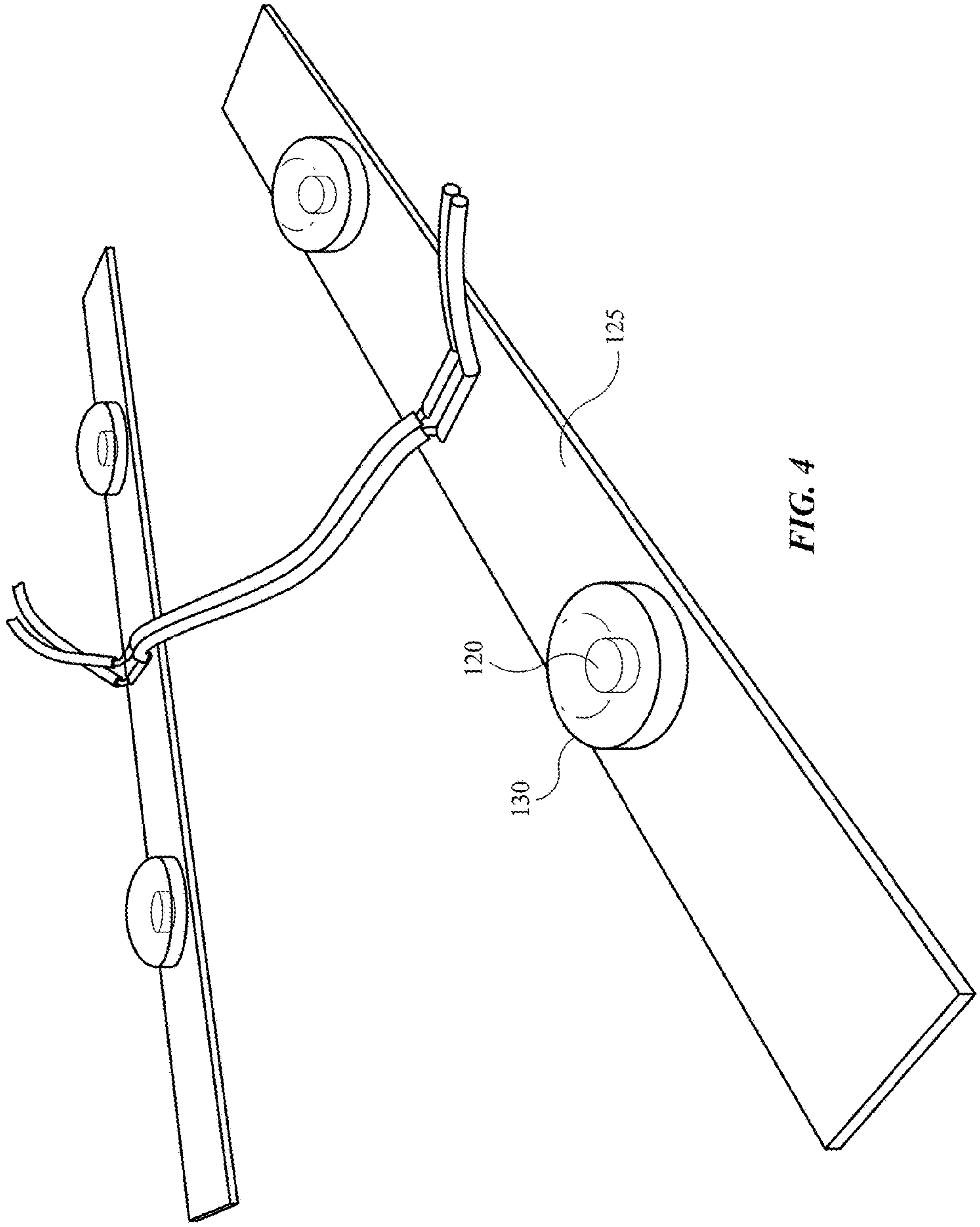
FIG. 4 shows a light-emitting diode and lens of a light fixture according to some embodiments.

Light source 120, according to some embodiments, is disposed within frame 110. In some embodiments, as shown, for example, in FIG. 4, light source 120 may be disposed on a support member 125, such as a beam or circuit board. In some embodiments, support member 125 is made of metal. Support member 125 may be attached directly to frame 110. In some embodiments, frame 110 may act as support member 125, and a separate support member may not be included. In some embodiments, multiple light sources 120 are disposed within frame 110. In some embodiments, multiple light sources 120 are disposed on support member 125 and multiple support members 125 are disposed within frame 110. Thus, in some embodiments, an array of light sources 120 are disposed within frame 110. Light source 120, as used herein, is therefore not limited to only a single light source 120.

In some embodiments, light source 120 is an LED. Light source 120 may be an LED having chromaticity coordinates that approximate the desired chromaticity coordinates for the light in the retail setting. Lens 130, according to some embodiments, is coupled to light source 120. In some embodiments, lens 130 is a diverging lens, thus providing a wide light emission angle for light from light source 120. In some embodiments, lens 130 emits light at a light emission angle of at least 150 degrees. For example, lens 130 may emit light at a light emission angle of 150, 155, or 160 degrees.

First filter layer 140 may be any material that allows light to pass through, including, for example, plastic, glass, and fabric as in first fabric layer 140. First fabric layer 140, according to some embodiments, is disposed within frame 110 at a first distance from lens 130. In some embodiments, first fabric layer 140 is disposed between two and twelve inches away from lens 130. For example, first fabric layer 140 may be disposed two, three, six, nine, or twelve inches away from lens 130. In some embodiments, first fabric layer 140 extends across the width and length of frame 110.

Figure 5:
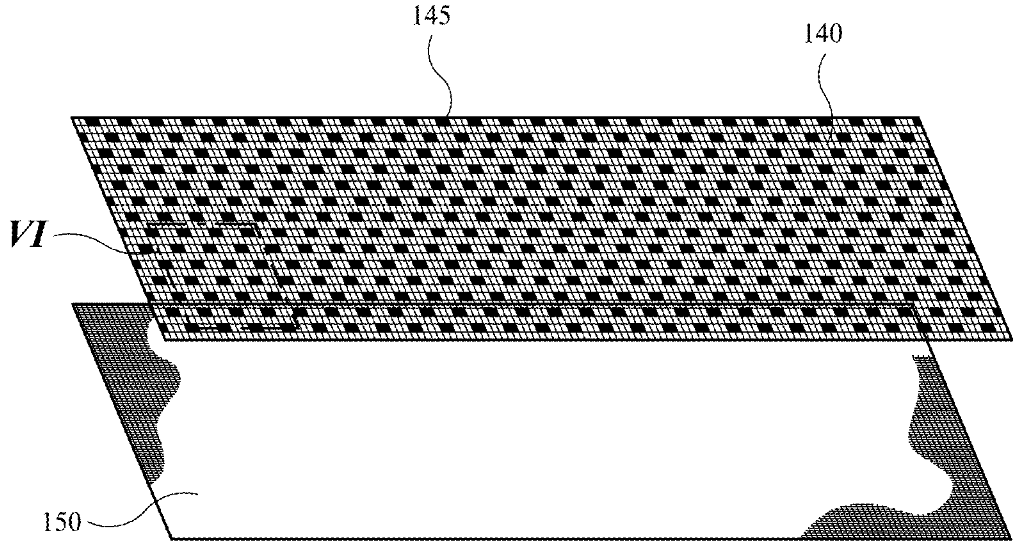
FIG. 5 shows a first and second fabric layer of a light fixture according to some embodiments.
Figure 6:
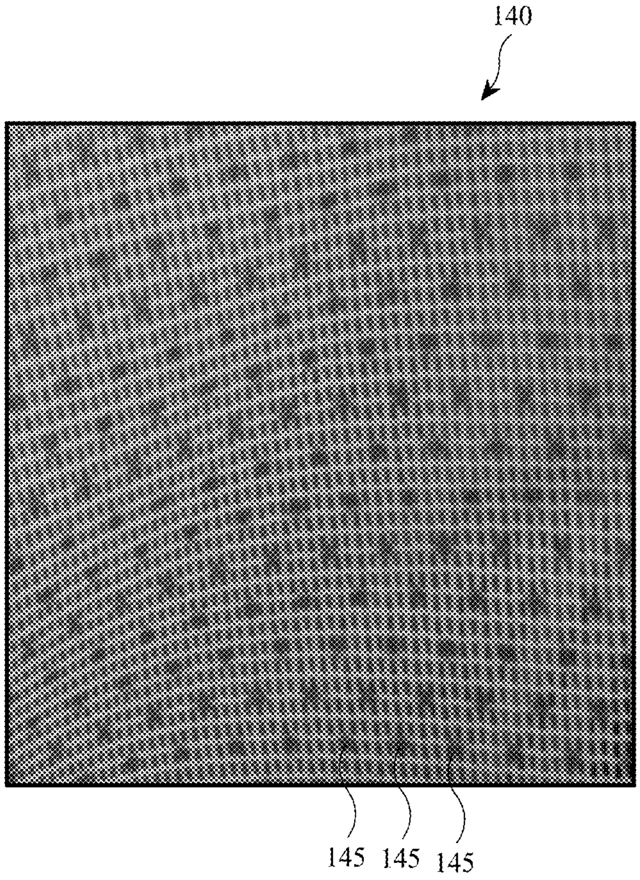
FIG. 6 shows a close-up photographic view of a portion VI of the first fabric layer schematically represented in FIG. 5 according to some embodiments.

In some embodiments, first fabric layer 140 includes a plurality of dots 145 disposed on first fabric layer 140, as shown, for example, in FIGS. 5 and 6. FIG. 5 schematically shows first fabric layer 140 and second fabric layer 150. FIG. 6 shows a photographic view of portion VI of first fabric layer 140 schematically represented in FIG. 5.

In some embodiments, dots 145 are disposed in a pattern, such as a matrix. In some embodiments, dots 145 are printed on first fabric layer 140. For example, dots 145 may be printed on first fabric layer 140 with a digital printer. In some embodiments, the digital printer is specifically designed for printing on fabric material. In some embodiments, dots 145 comprise ink. Dots 145 may be circular, oval, square, rectangular, or other polygonal shape. The color, shape, and size of the dots may influence the chromaticity coordinates of the light emanating from light source 120. In addition, the density of the pattern of dots 145 (e.g., a measure of the distance between adjacent dots 145), also may affect the chromaticity coordinates of the light emanating from light source 120.

According to some embodiments, first fabric layer 140 is a lightly woven fabric, such as a sheer fabric or gauze. In some embodiments, first fabric layer 140 is translucent. For example, first fabric layer 140 may be loosely-woven so that it gives the impression that dots 145 are floating in air. For example, first fabric layer 140 may appear transparent. Some light passes through first fabric layer 140 while some light reflects back within frame 110. In some embodiments, at least fifty percent of the light passes through first fabric layer 140 (e.g., 75%-90%). In some embodiments, at least ninety percent of the light passes through first fabric layer 140.

Second filter layer 150 may be any material that allows light to pass through, including, for example, plastic, glass, and fabric as in second fabric layer 150. Second fabric layer 150, according to some embodiments, is disposed within frame 110 at a second distance from lens 130. In some embodiments, the second distance from lens 130 is greater than the first distance from lens 130. In some embodiments, second fabric layer 150 is disposed between six and twenty-four inches away from lens 130. For example, second fabric layer 150 may be disposed six, nine, fifteen, eighteen, or twenty-four inches away from lens 130. In some embodiments, second fabric layer 150 extends across the width and length of frame 110. In some embodiments, second fabric layer 150 encloses light source 120, lens 130, and first fabric layer 140 within frame 110.

In some embodiments, second fabric layer 150 comprises glass fiber. In some embodiments, second fabric layer 150 comprises polyester. According to some embodiments, second fabric layer 150 is a finished fabric. For example, second fabric layer 150 may comprise a chemical finish or may go through a mechanical finishing process. In some embodiments, the fabric finish may give second fabric layer 150 a consistent appearance across its surface. In some embodiments, second fabric layer 150 acts as a light diffuser. Thus, some light passes through second fabric layer 150 while some light reflects back within frame 110. In some embodiments, at least fifty percent of the light that passed through first fabric layer 140 passes through second fabric layer 150 (e.g., 70%-80%). In some embodiments, at least eighty percent of it passes through second fabric layer 150. Accordingly, the light produced by light fixture 100 is homogenous throughout second fabric layer 150 instead of having a bright spot at the position of light source 120. In some embodiments, the fabric finish may improve the function of second fabric layer 150 as a light diffuser by providing a uniform surface from which to emanate through or reflect from.

Figure 7:
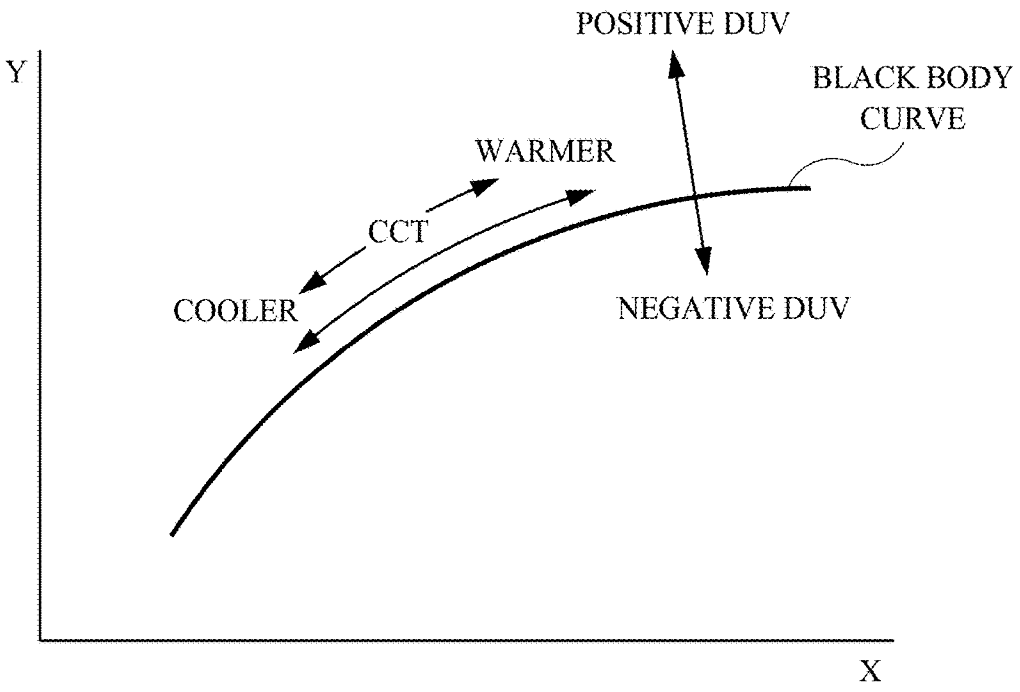
FIG. 7 shows a graph of a black body curve.

According to some embodiments, light fixture 100 may be used to adjust overall chromaticity coordinates of a commercially available LED to reach specified target coordinates. FIG. 7 depicts a graph of a black body curve in a color space, with x and y representing the chromaticity coordinates, which are derived from properties of light. As noted above, the chromaticity coordinates correspond to CCT and Duv values. Chromaticity coordinates below the black body curve correspond to a negative Duv value while chromaticity coordinates above the black body curve correspond to a positive Duv value. CCT values increase as they move along the black body curve to the left, with higher CCT values representing a cooler color temperature and lower CCT values representing a warmer color temperature.

Figure 8:
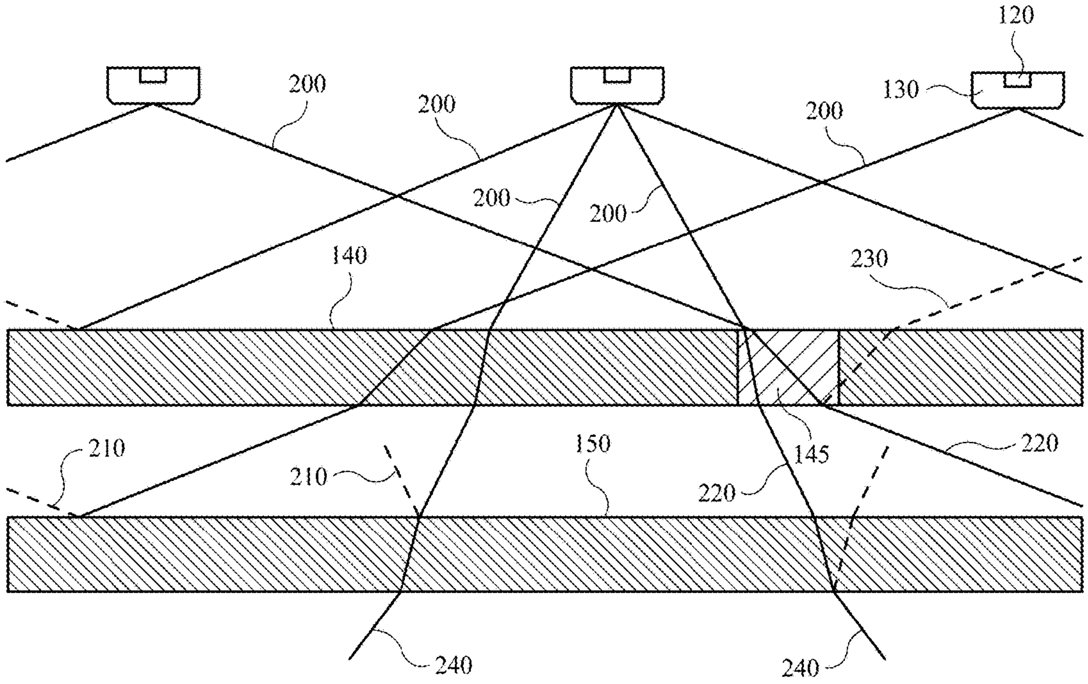
FIG. 8 shows a schematic of a light fixture according to some embodiments.

As shown in FIG. 8, light emanating from light source 120 passes through lens 130 and then through first fabric layer 140 (or dot 145) and second fabric layer 150. In some embodiments, lens 130 provides a wide light emission angle, as described above. The wide light emission angle leads to a variety of incident angles of light beams to first fabric layer 140, which is the angle between the light beam and the normal of the surface of first fabric layer 140. The larger the incident angle of a light beam to first fabric layer 140 (or dot 145) and second fabric layer 150, the more the light is modified because it leads to a longer light path through first fabric layer 140 (or dot 145) and second fabric layer 150.

Light beams either pass through a layer (refract) or reflect back. Originally, light beam 200 has particular chromaticity coordinates. In FIG. 8, reflected light beams are represented by dashed lines, while refracted light beams remain solid. As light beam 200 refracts through dot 145, the chromaticity coordinates are modified to produce light beam 220. In addition, light beam 230 is produced through reflection and also has modified chromaticity coordinates. Another light beam 200 may refract through first fabric layer 140 and reflect from second fabric layer 150, thus producing light beam 210. Light beam 210 may pass back through first layer 140 or dot 145. Because the inner surface of frame 110 is provided with a reflective surface, the various light beams continue to travel through light fixture until the light emits from second fabric layer 150. The combination of these various light beams, each traveling different paths through the layers of light fixture 100, produces the desired characteristics of emitted light 240 for the retail setting.

The schematic in FIG. 8 is only illustrative. Reflection can occur at either surface of a fabric layer and some light beams may pass through the layers multiple times. In addition, although not illustrated, the chromaticity coordinates may be modified as a light beam passes through first fabric layer 140 (and not dot 145) and/or second fabric layer 150. The combination of all light beams produces the light that emits from light fixture 100.

Figure 9:
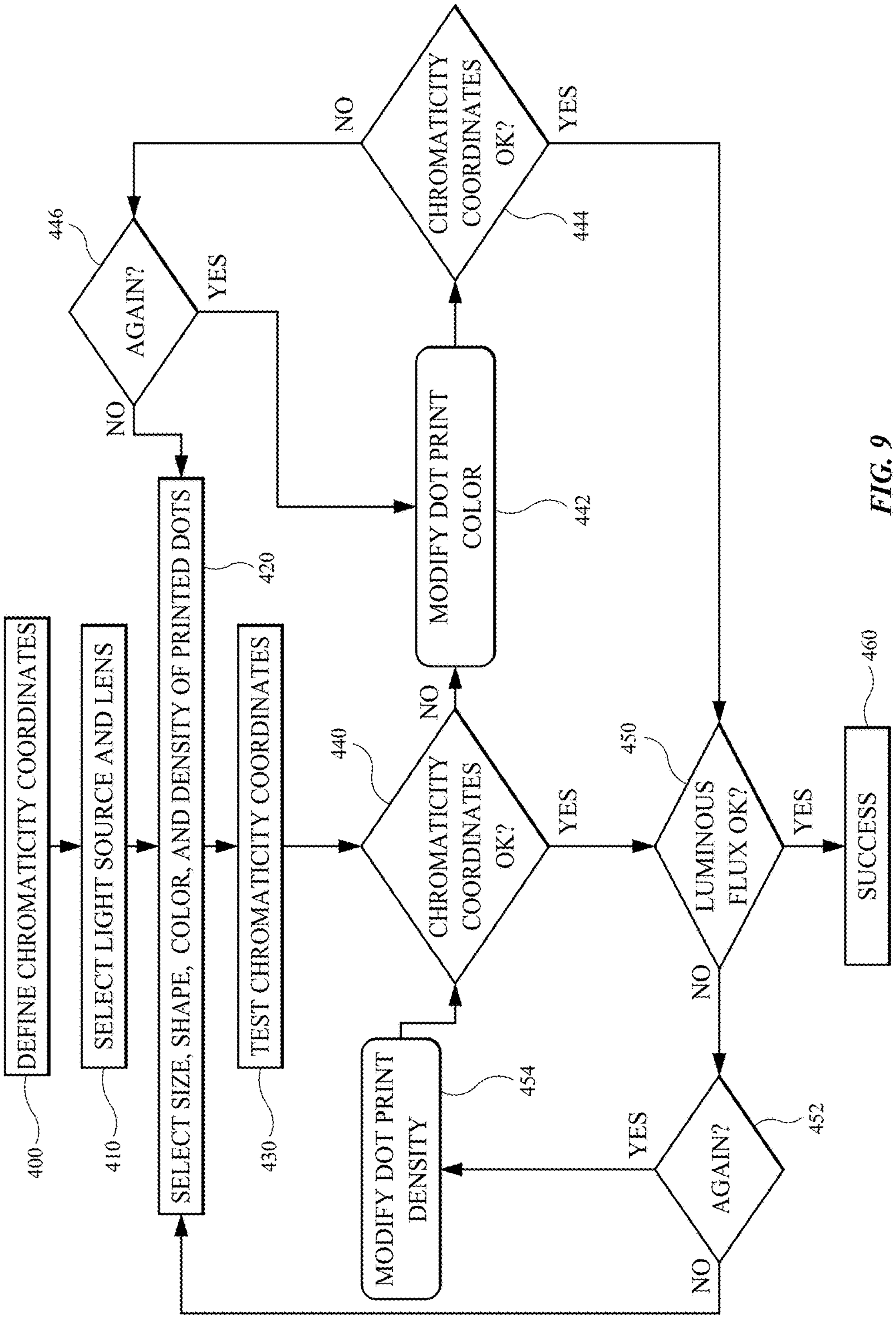
FIG. 9 shows a process for designing a light fixture according to some embodiments.

FIG. 9 illustrates a process for determining the specific configuration of light fixture 100 according to some embodiments. The process is an optimization scheme to identify the appropriate parameters of dots 145 on first fabric layer 140.

In operation 400, target chromaticity coordinates are defined. The target chromaticity coordinates, in some embodiments, may be defined to convey a particular message or feeling to a consumer in the retail store. For example, the warmth or coolness of the light may affect the feeling of a consumer. In operation 410, the light source 120 and lens 130 are selected. In some embodiments, the light source 120 selected is an LED that approximates the target chromaticity coordinates. However, as described above, because LEDs are divided into commercially available LED bins that cover a range of chromaticity coordinates, the LED may not be an exact match to the target chromaticity coordinates.

In operation 420, the size, shape, color, and density of dots 145 printed on first fabric layer 140 are selected. In operation 430, the selected size and shape are used to test the resulting chromaticity coordinates. In operation 440, it is determined by measuring the light output whether the chromaticity coordinates meet the target values.

If the chromaticity coordinates meet the target values in operation 440, then it is determined by measuring the light output whether the luminous flux is acceptable in operation 450. If the luminous flux is acceptable in operation 450, then the appropriate light fixture 100 has been designed to successfully reach the target chromaticity coordinates in operation 460. Because the luminous flux relates to the efficiency of light fixture 100, whether the luminous flux is acceptable depends on the desired efficiency for light fixture 100. If the luminous flux is too small with respect to the LED used in light fixture 100 then the light is inefficiently passing through light fixture 100. In operation 452, if the luminous flux is not acceptable, it is determined whether to try again by simply adjusting the dot print density, as in operation 454, or to also re-select the size, shape, and color of dots 145, by returning to operation 420. If the dot print density is modified in operation 454, then the process continues by determining whether the chromaticity coordinates now meet the target values in operation 440.

If the chromaticity coordinates do not meet the target values in operation 450, then the dot print color is modified in operation 442. The process continues by determining whether the chromaticity coordinates now meet the target values in operation 444. If the answer is yes, then it is determined whether the luminous flux is acceptable in operation 450. If the answer is no, it is determined in operation 446 whether to modify the dot print color again, as in operation 442, or to also re-select the size, shape, and density of dots 145, by returning to operation 420. The process continues until the target values have been reached. Operations 446 and 452 are part of the process for situations where the optimization after several cycles does not sufficiently converge to the target values. In these situations, rather than only modifying the dot print density or color, the shape and size of the dots 445 may also be modified.

Figure 10:
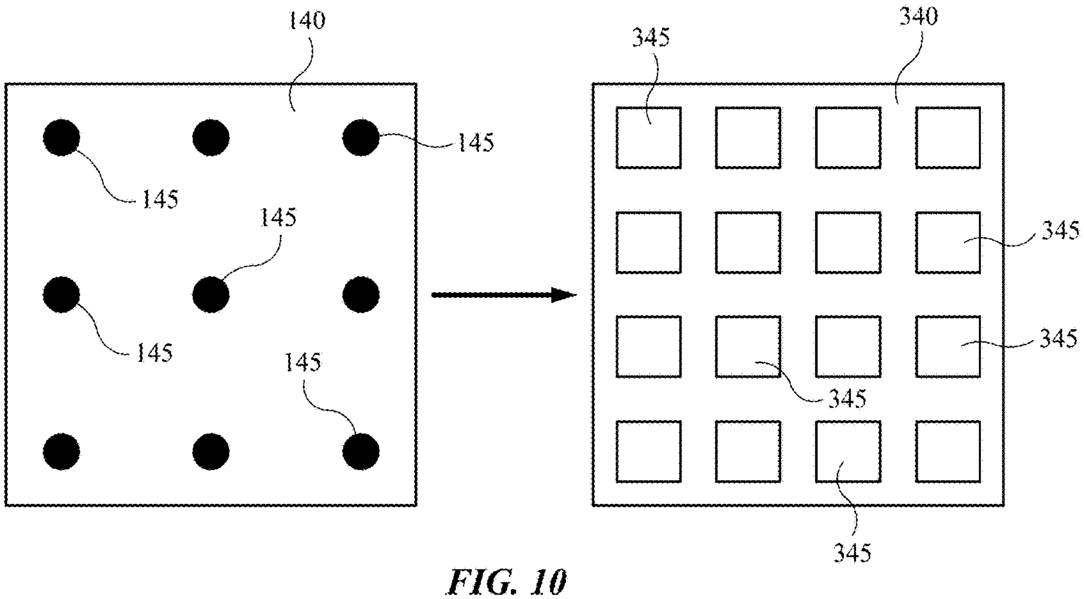
FIG. 10 shows a schematic of a first fabric layer according to some embodiments.

An exemplary modification to dots 145 is illustrated in FIG. 10. For example, first fabric layer 140 having dots 145 may be modified or replaced with first fabric layer 340 having dots 345. In some embodiments, the shape of the dots may be modified. For example, circular dots 145 may be replaced by square dots 345. In some embodiments, the color of the dots may be modified. For example, dots 145 of a certain color may be replaced with dots 345 of a different color. In some embodiments, the size of the dots may be modified. For example, dots 145 may be replaced with enlarged dots 345. In some embodiments, the density of dots may be modified. For example, fabric layer 140 having nine dots 145 within a given area may be replaced with first fabric layer 340 having sixteen dots 345 within the same size area. These modifications are only exemplary and any other change in size, shape, color, and density are within the scope of this disclosure.

The following general guidelines may assist in determining selection and modification of parameters in operations 420, 442, and 454. As the area of first fabric layer 140 containing dots 145 increases, the more the chromaticity coordinates are shifted and the luminous flux reduced. Thus, an increase in the size of dots 145 leads to an increased change of chromaticity coordinates and a decrease in luminous flux. Similarly, an increase in the density of dots 145 (i.e., less space between dots 145) leads to an increased change of chromaticity coordinates and a decrease in luminous flux. In addition, the more intense the color of dots 145, the more the chromaticity coordinates are shifted. Whether the chromaticity coordinates will shift to be warmer or colder depends on the selected dot color. Using a dot color above the chromaticity coordinates of the light without dots 145 will tend to make the resulting light colder, while a dot color below the chromaticity coordinates of the light without dots 145 will tend to make the resulting light warmer. Both fabric layers 140 and 150 themselves will also affect the chromaticity coordinates of the light emanating from light fixture 100.

Figure 11:
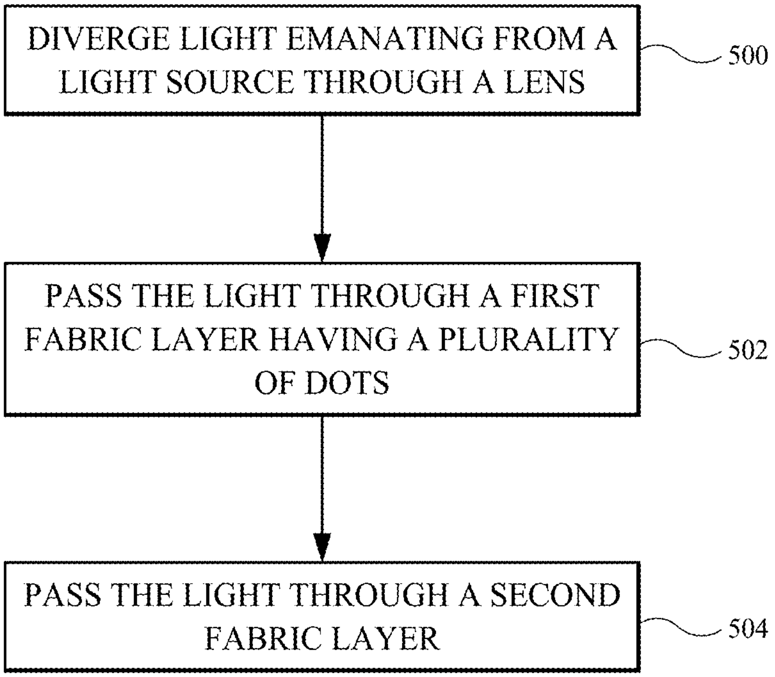
FIG. 11 shows a method of producing light according to some embodiments.

A method for producing light with desired color characteristics according to some embodiments is illustrated, for example, in FIG. 11. In operation 500, light emanating from a light source is diverged through a lens. In operation 502, the light is passed through a first fabric layer having a plurality of dots disposed thereon. In operation 504, the light is passed through a second fabric layer to diffuse the light. As the light is passed through the first fabric layer and the second fabric layer, the color characteristics of the light are altered as discussed above.

Figure 12:
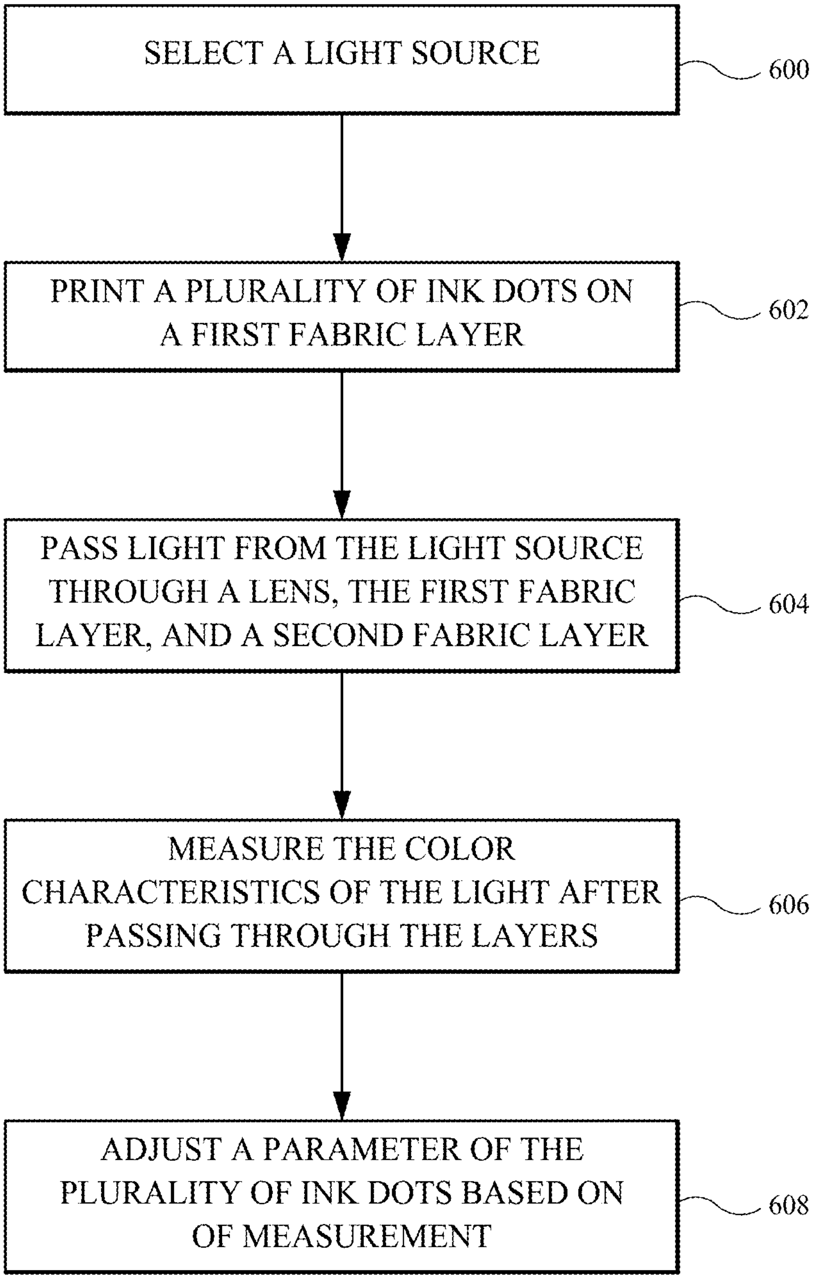
FIG. 12 shows a method of making a light fixture according to some embodiments.

A method for making a light capable of producing light with desired color characteristics according to some embodiments is illustrated, for example, in FIG. 12. In operation 600, a light source is selected. According to some embodiments, the light source approximates the desired color characteristics. In operation 602, a plurality of ink dots is printed on a first fabric layer. In operation 604, light emanating from the light source is passed through a lens, the first fabric layer, and a second fabric layer. In operation 606, the color characteristics of the light after passing through the layers is measured. In operation 608, a parameter of the plurality of printed ink dots is adjusted based on measuring the color characteristics. In some embodiments, the parameter adjusted is a pattern of the plurality of printed ink dots. In some embodiments, the parameter is a color of the plurality of printed ink dots. In some embodiments, the parameter is a shape of the plurality of printed ink dots. In some embodiments, the parameter is a size of the plurality of printed ink dots. In some embodiments, the parameter is a density of the plurality of printed ink dots. In some embodiments, more than one parameter is adjusted. In operation 610, a color of the second fabric layer is adjusted. In some embodiments, the material of the second fabric layer is adjusted (e.g. polymer to glass fiber), which may also involve an adjustment in color.

The foregoing descriptions of the specific embodiments described herein are presented for purposes of illustration and description. These exemplary embodiments are not intended to be exhaustive or to limit the embodiments to the precise forms disclosed. All specific details described are not required in order to practice the described embodiments.

It will be apparent to one of ordinary skill in the art that many modifications and variations are possible in view of the above teachings, and that by applying knowledge within the skill of the art, one may readily modify and/or adapt for various applications such specific embodiments, without undue experimentation, without departing from the general concept of the present invention. Such adaptations and modifications are intended to be within the meaning and range of equivalents of the disclosed embodiments, based on the teaching and guidance presented herein.

The detailed description section is intended to be used to interpret the claims. The summary and abstract sections may set forth one or more but not all exemplary embodiments of the present invention as contemplated by the inventor(s), and thus, are not intended to limit the present invention and the claims.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The phraseology or terminology used herein is for the purpose of description and not limitation, such that the terminology or phraseology of the present specification is to be interpreted by the skilled artisan.

The breadth and scope of the present invention should not be limited by any of the above-described exemplary embodiments, but should be defined in accordance with the claims and their equivalents.

What is claimed is:

1. A light fixture comprising:

a frame;

an array of light sources disposed within and coupled to the frame;

a lens coupled to each light source;

a first fabric layer disposed within and coupled to the frame at a first distance from the lenses and having a plurality of dots printed thereon, wherein the first fabric layer extends across a width and a length of the frame; and a second fabric layer disposed within and coupled to the frame at a second distance from the lenses, wherein the second distance is greater than the first distance, and wherein the second fabric layer extends across a width and a length of the frame.

2. The light fixture of claim 1, wherein the second fabric layer encloses the array of light sources, the lenses, and the first fabric layer within the frame.

3. The light fixture of claim 1, wherein the dots comprise ink.

4. The light fixture of claim 1, wherein the dots form a matrix.

5. The light fixture of claim 1, wherein the dots are uniformly distributed on the first fabric layer.

6. The light fixture of claim 1, wherein the first fabric layer comprises a lightly woven fabric.

7. The light fixture of claim 1, wherein the first fabric layer comprises a translucent fabric.

8. The light fixture of claim 1, wherein the first fabric layer comprises gauze.

9. The light fixture of claim 1, wherein the first fabric layer comprises a sheer fabric.

10. The light fixture of claim 1, wherein the second fabric layer comprises a finished fabric.

11. The light fixture of claim 1, wherein the array of light sources comprises a light-emitting diode.

12. The light fixture of claim 1, wherein the frame comprises an acoustical panel.

13. The light fixture of claim 1, wherein the lenses comprise a diverging lens.

14. The light fixture of claim 1, wherein the second fabric layer comprises a light diffuser.

15. The light fixture of claim 1, wherein the second fabric layer comprises glass fiber.

16. The light fixture of claim 1, wherein the second fabric layer comprises polyester.

17. The light fixture of claim 1, wherein the first fabric layer is configured to adjust a color characteristic of light emanating from the array of light sources by a combination of reflecting light, passing light through areas of the first fabric layer without dots, and passing light through the dots.

18. A light fixture comprising:

a frame;

a light source disposed within and coupled to the frame;

a lens coupled to the light source;

a first fabric layer coupled to the frame at a first distance from the lens and having a plurality of dots printed thereon; and a second fabric layer coupled to the frame at a second distance from the lens, wherein the first fabric layer is configured to adjust a color characteristic of light emanating from the light source by interaction with the dots.

19. The light fixture of claim 18, wherein the color characteristic comprises color temperature.

20. A method of producing light with desired color characteristics comprising:

diverging light emanating from an array of light sources through lenses coupled to the light sources;

passing the light through a first fabric layer having a plurality of dots disposed thereon, the first fabric layer disposed at a first distance from the lenses; and passing the light through a second fabric layer configured to diffuse the light, the second fabric layer disposed at a second distance from the lenses, wherein the second distance is greater than the first distance, wherein the color characteristics of the light are altered by the first fabric layer and the second fabric layer.

21. The method of claim 20, wherein the dots comprise ink.

22. The method of claim 20, wherein the dots are printed on the first fabric layer.

23. The method of claim 20, wherein the dots are disposed in a pattern on the first fabric layer.

24. The method of claim 20, wherein the color characteristics comprise color temperature.

25. The method of claim 20, wherein the produced light is homogeneous throughout the second fabric layer.

26. A method of making a light capable of producing light with desired color characteristics comprising:

selecting light sources that approximate the desired color characteristics;

printing a plurality of ink dots on a first fabric layer;

passing light emanating from the light sources through the first fabric layer, and a second fabric layer, wherein the second fabric layer is disposed below and spaced apart from the first fabric layer;

measuring color characteristics of the light; and adjusting a parameter of the plurality of printed ink dots based on measuring the color characteristics.

27. The method of claim 26, wherein adjusting a parameter comprises adjusting a pattern of the printed ink dots.

28. The method of claim 26, wherein adjusting a parameter comprises adjusting a color of the printed ink dots.

29. The method of claim 26, wherein adjusting a parameter comprises adjusting a shape of the printed ink dots.

30. The method of claim 26, wherein adjusting a parameter comprises adjusting a size of the printed ink dots.

31. The method of claim 26, wherein adjusting a parameter comprises adjusting a density of the printed ink dots.

32. The method of claim 26, further comprising adjusting a color of the second fabric layer.

* * * * *